Patented May 22, 1923.

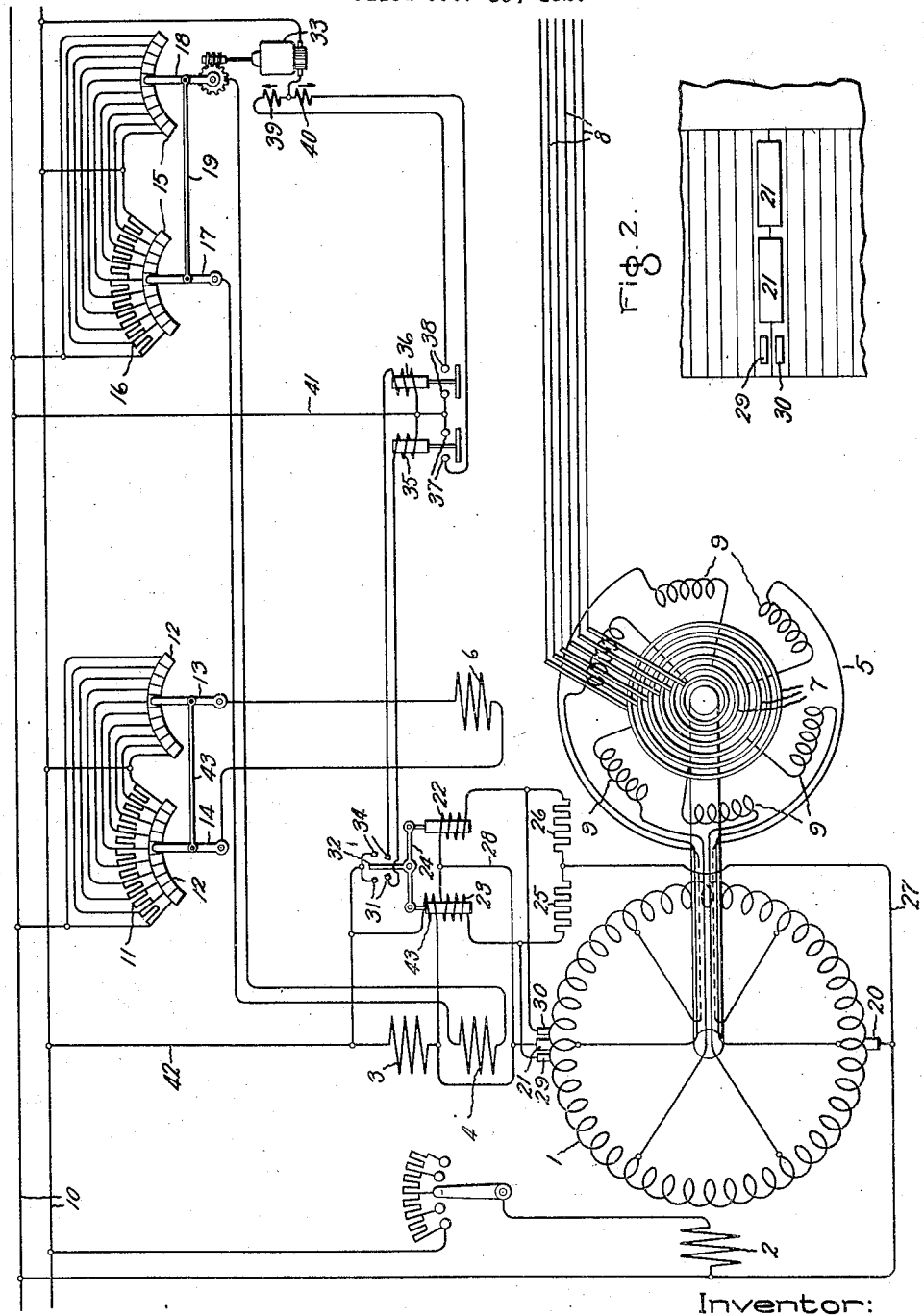

1,456,092

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

DYNAMO-ELECTRIC MACHINE.

Application filed October 30, 1920. Serial No. 420,780.

*To all whom it may concern:*

Be it known that I, JOSEPH L. BURNHAM, a citizen of the United States, residing at Schenectady, county of Schenectady, State of New York, have invented certain new and useful Improvements in Dynamo-Electric Machines, of which the following is a specification.

My invention relates to dynamo-electric machines and particularly to such machines provided with anti-sparking windings.

In a patent granted in my name, No. 1,055,873, issued March 11, 1913, there is described a dynamo-electric machine with anti-sparking windings, the excitation of these windings being directly controlled by the voltage difference from heel to toe of any one of the brushes bearing upon the commutator of the dynamo-electric machine. My present invention consists of an improvement on the arrangement shown in this prior patent in that the effect of this voltage difference is magnified, so that the principle described in the above patent may be applied to practically all types of electric machines using a commutating winding, although the effect of bad commutation is to cause only a slight voltage difference between the heel and toe of any brush. The control of the anti-sparking winding in response to the voltage difference between heel and toe of the main brush has the advantage, as pointed out in my prior patent, that proper commutation conditions may be produced irrespective of the operating conditions present which tend to prevent good commutation. These operating conditions for example may be due in a synchronous converter to a booster connected either at the alternating current side or the direct current side. Other conditions affecting commutation may be those arising from the saturation of any of the field poles of the machine, as the load increases.

With my present invention in order to attain the objects mentioned hereinbefore and to cause efficient and positive regulation, I use the voltage difference to influence a pair of balanced, independently energized relays, in such a way that when this voltage difference varies from the value desired, controlling means are set into operation for bringing this voltage difference back to the desired value and thus improve the commutation. The main advantage of this invention is therefore that delicate control of the excitation may be had, although the effect made use of to produce the regulation may be of a relatively feeble nature. Other objects and advantages will become apparent as the description proceeds.

For a better understanding of my invention, reference may be had to the following description taken in connection with the accompanying drawing in which Fig. 1 is a schematic wiring diagram, showing how my invention may be utilized to control the commutation characteristics of a synchronous converter of the booster type; and Fig. 2 is a plan view of the commutator and the brushes thereon.

Referring now more in detail to the drawing, I have shown a synchronous converter 1 having a main exciting winding 2, a series anti-sparking or commutating field winding 3 and an auxiliary anti-sparking or commutating field winding 4. The converter 1 is mechanically connected to a booster 5 having a field winding 6. The booster is shown as being of the synchronous type connected through collector rings 7 to alternating current mains 8 and having its alternating current windings 9 connected to the armature winding of the converter. The armature of the converter is also shown connected to the direct current mains 10. The field 6 of the booster 5 may be varied and reversed by connecting its field winding 6 to a source of voltage which may be varied over a wide range and reversed. This source of voltage comprises a set of resistances 11 connected across the direct current mains 10. The set of resistances 11 are preferably the resistance elements of the double dial rheostat 12. The simultaneous movement of the double dial rheostat arms 13 and 14 is shown in this instance as manually effected in order to vary and reverse the current flowing through the booster exciting winding 6. To perform this function conveniently, a connecting rod 43 between arms 13 and 14 may be provided. When the arms 13 and 14 engage the extreme left-hand contacts of the double dials, the full voltage of the mains is applied to the field winding 6 in one direction. By moving the arms to adjacent contacts a voltage less than that of the mains is applied to this field winding, and a further movement of the arms still further decreases the voltage applied to the winding 6. When the arms engage the middle contacts, no voltage is applied to the winding 6. Upon a further movement of the arms toward the right, a voltage less than the line voltage is applied to the field winding but in the opposite direction to that which was applied when the arms engaged contacts at the left of the middle contact. As the arms approach the extreme right-hand contact, the voltage applied increases, until full voltage is applied to the winding 6 in the opposite direction to that applied when the arms engaged the extreme left-hand contact. The means described above for varying the excitation of winding 6 forms no part of my present invention, and is included here for the sake of making the description complete.

The auxiliary anti-sparking winding 4 receives its exciting voltage from a double dial rheostat 15 comprising the set of resistances 16 and arranged in a manner similar to the resistances 11. The resistances 16 are also connected to the direct current mains 10 and the arms 17 and 18 are adapted for simultaneous movement by means of the cross connecting rod 19. It is evident that the amount of excitation of the auxiliary anti-sparking windings 4 as well as its direction may be determined by the movement of the arms 17 and 18, in the same way as has been described in connection with the rheostat 12. This movement is effected in response to the difference of voltage between the heel and toe of any of the main brushes 20 or 21.

For performing the movement of the arms 17 and 18, I make use of the mechanically opposed electromagnets 22 and 23 which act upon a balanced lever arm 24. This balanced lever arm 24 is pivoted near its center as shown, and the electromagnets are arranged so that they may tilt this lever arm in one direction or the other. These electromagnets are energized independently from the main brushes 20 and 21 of the converter 1. As shown, the electromagnets 22 and 23 are respectively in series with resistances 25 and 26 and then placed in parallel with each other. A lead 27, leading from the main brush 20 to both of the resistances 25 and 26, serves as one pole of the energization, while the lead 28 connected between the two coils of the electromagnets 22 and 23 leads to the opposite polarity brush 21. If the circuits through the electromagnets 22 and 23 are made to have substantially equal constants, then so far as is now described, the flow of current through both the coils 22 and 23 would be equal, and the pivoted lever 24 would stay in a horizontal position, untilted in either direction. However, to affect these electromagnets in accordance with the difference of voltage between the heel and toe of the brushes, I make use of a pair of auxiliary brushes 29 and 30 placed one on each side of the main brush 21 disposed as shown clearly on Fig. 2, and connected across both of the energizing coils 22 and 23, in the manner shown. It is evident that should there be any appreciable difference in voltage between these two brushes, then a local current will flow through the coils 22 and 23, tending to tilt the lever arm 24 in one or the other direction, depending upon which of the two auxiliary brushes has the higher potential. It is also evident that instead of having this voltage from the auxiliary brushes conducted to the same coils as the main voltage between brushes 20 and 21, it would be possible to utilize separate coils on the cores of the electromagnets 22 and 23, or any other means which affect these electromagnets in accordance with the difference of voltage between the heel and toe of the main brushes.

When the lever arm 24 is tilted to the left, then the left-hand contacts 31 are connected together by means of the contact piece 32 movable with the lever 24. This has the effect of causing the energization of a small pilot motor 33 in such a direction that the double dial rheostat 15, the arm 18 of which is geared to the pilot motor, is operated to cause the energization of the auxiliary winding 4 to be varied in the proper direction to bring the lever arm 24 back to normal. After the voltage difference between auxiliary brushes 29 and 30 reduces to the proper value, the pilot motor 33 is automatically disconnected, due to the fact that the lever 24 returns to its untilted position. On the other hand, should the lever 24 be tilted in the right-hand direction, then the contacts 34 are connected together and the pilot motor is actuated in the opposite direction to that mentioned heretofore. It is thus evident that the contacts 31 and 34, which are closed in response to the relative energization of the electromagnets 22 and 23 affect the dial rheostat 15 to vary the excitation of the auxiliary winding 4.

Any well known means for controlling the pilot motor 33 may be utilized. In the present instance I so arrange matters that upon completion of the circuit either at 31 or 34, one of the relays 35 or 36 operates. These relays control contacts 37 and 38, which complete the armature circuit of the motor 33 through one or the other of the series field winding 39 or 40 opposed to each other, as shown by the arrows. The completed circuit for this pilot motor, for example when contacts 34 are closed, is, from one of the mains 10, through the armature 33, through the field 39, contacts 38, through lead 41 to the other of mains 10. The relay 36 which causes the contacts 38 to be bridged is energized from the lead 42 connecting to one of the mains 10, through contacts 34, through relay 36 to the lead 41. On the other hand, should the contacts 31 be connected by arm 32 the same sort of control is effected by means of the relay 35 and the series field 40, but instead the pilot motor 33 is made to rotate in the opposite direction. When the lever 24 is in its untilted position, the relays 35 and 36 are deenergized and contacts 37, 38 are open, and the circuit through the pilot motor 33 is incomplete.

It is sometimes found in practice that the best commutation is obtained when there is a slight voltage difference between the brushes 29 or 30. In order to produce this effect in this regulating scheme it is merely necessary to add a series coil 43 to one of the electromagnets 32 and 33, which coil 43 is excited in accordance with the current flow through the armature. In the present instance I show the coil 43 connected in parallel to the series commutating field 3. The excitation of this series coil may assist or oppose the main coil 23 and the excitation on that side of the relay, which is due to the voltage difference of brushes 29 and 30, must be either weaker or stronger in order to obtain a balance. With balanced condition under such circumstances, one of the brushes 29 or 30 is at a higher potential than the other; and this effect can be adjusted to any desired value. The arrangement as shown also gives an increasing difference in voltage between the heel and toe of the main brush 21 with increase in load which is the exact condition as has been found for the best commutation. Another way of producing a similar effect would be to adjust the relative weights of the cores of the electromagnets, so as to make them unequal. This would cause a constant voltage difference between auxiliary brushes 29 and 30.

The operation of the embodiment of my invention that I have illustrated, is as follows: so long as the voltage difference of brushes 29 and 30 is at the proper value for the particular load carried by the converter, the windings upon the electromagnets 22 and 23 produce such an effect that the lever 24 is in its untilted, horizontal position. Should this balance be disturbed, say for example by an increased load, causing increased current flow through coil 43, the lever 24 is rotated, and the pilot motor 33 energized. This keeps on varying the excitation for winding 4 in the proper direction until a balance is again restored, causing the arm 24 to return to its untilted position. To produce this effect, it may be necessary to reverse the excitation of winding 4, and this is accomplished merely by continued movement of the arms 17 and 18 of the double dial rheostat 15, as has been explained heretofore.

It is evident that the arrangement of the coils on electromagnets 22 and 23 is such that a balance is obtained due to the combined effect of the voltage between the heel and toe of the brushes, and the current flow in the armature. While I have shown one particular type of relay that may be affected by these values, it is of course readily seen that other well known schemes may be applied to produce the same result. Furthermore, while I have shown in the accompanying drawing but one embodiment of my invention, I do not wish to be limited thereto but aim to embrace in the appended claims all modifications falling fairly within the scope of my invention.

What I claim as new and desire to secure by Letters Patent of the United States, is,—

1. In a dynamo-electric machine, an armature winding provided with a commutator, brushes on said commutator, an anti-sparking winding, and means for controlling the effect of said winding comprising a pair of mechanically opposed electromagnets excited in parallel from a common source of energy, and means affecting these electromagnets in accordance with the difference of voltage from heel to toe of said brushes.

2. In an electrical machine, a winding, a commutator connected to said winding, brushes on said commutator, an anti-sparking winding arranged to influence the first mentioned winding, means for exciting the anti-sparking winding, and means for varying the excitation comprising a pair of mechanically opposed electromagnets having their coils energized in parallel from a common source, and means affecting these electromagnets in accordance with the difference of voltage from heel to toe of said brushes.

3. In a dynamo-electric machine, an armature winding provided with a commutator, brushes on said commutator, anti-sparking windings connected in series with said armature winding, auxiliary anti-sparking windings, and means for varying the excitation of said auxiliary winding comprising a balanced lever arm, a pair of electromagnets arranged to tilt said arm in opposite directions, means for energizing said electromagnets, and means responsive to the difference of voltage from heel to toe of the brushes for affecting the position of said lever arm.

4. In a dynamo-electric machine, an armature winding provided with a commutator, anti-sparking windings connected in series with said armature winding, auxiliary anti-sparking windings, main brushes bearing on the commutator, a pair of mechanically opposed electromagnets energized from said brushes, means responsive to the difference of voltage from heel to toe of the brushes for modifying the energization of the electromagnets, contacts operated in response to the relative energizations of the electromagnets, an auxiliary anti-sparking winding, and means whereby the contacts vary the excitation of said auxiliary winding.

5. In a dynamo-electric machine, an armature winding provided with a commutator, an anti-sparking winding connected in series with said armature winding, an auxiliary anti-sparking winding, and means for controlling the effect of said auxiliary winding comprising a pair of mechanically opposed electromagnets, means affecting these electromagnets in accordance with the difference of voltage from heel to toe of said brushes, and means affecting one of these electromagnets in accordance with the current flow in said armature.

6. In a dynamo-electric machine, an armature winding provided with a commutator, main brushes bearing on said commutator, an anti-sparking winding in series with said armature, an auxiliary anti-sparking winding, auxiliary brushes on each side of one of said main brushes, a lever pivoted near its center, electromagnets at each end of said lever energized from the main brushes and from the auxiliary brushes, one of said electromagnets being also energized in accordance with the load current, contacts operated by the pivoted lever and controlling means for varying the excitation of the auxiliary anti-sparking winding, said controlling means being rendered active in response to the operation of the contacts.

7. In an electrical machine, a winding, a commutator connected to said winding, brushes on said commutator, an anti-sparking winding arranged to influence the first mentioned winding, means for exciting the anti-sparking winding, and a device jointly influenced by the difference in voltage from heel to toe of said brushes and by the current flow through said machine for varying the excitation in accordance with variations in said first mentioned quantities.

In witness whereof, I have hereunto set my hand this 29th day of October, 1920.

JOSEPH L. BURNHAM.